US008887870B2

(12) United States Patent
Okada et al.

(10) Patent No.: US 8,887,870 B2
(45) Date of Patent: Nov. 18, 2014

(54) BREATHER DEVICE OF AUTOMATIC TRANSMISSION

(75) Inventors: Naoya Okada, Anjo (JP); Shyusaku Kitamura, Okazaki (JP); Atsushi Nakamura, Anjo (JP); Naoki Itazu, Nagoya (JP); Toshihiro Fukumasu, Nagoya (JP); Hiromitu Metugi, Nagoya (JP); Masaharu Tanaka, Toyota (JP)

(73) Assignees: Aisin Aw Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 1512 days.

(21) Appl. No.: 12/216,034

(22) Filed: Jun. 27, 2008

(65) Prior Publication Data

US 2009/0000874 A1    Jan. 1, 2009

(30) Foreign Application Priority Data

Jun. 29, 2007  (JP) .................. 2007-172895

(51) Int. Cl.
*F01M 11/08*  (2006.01)

(52) U.S. Cl.
USPC ........................................ 184/6.23

(58) Field of Classification Search
USPC .................................. 184/1.5, 6.23
See application file for complete search history.

(56) References Cited

U.S. PATENT DOCUMENTS

| | | | | | |
|---|---|---|---|---|---|
| 442,529 | A | * | 12/1890 | Merrill | 137/197 |
| 2,308,376 | A | * | 1/1943 | Mader | 123/196 A |
| 2,314,963 | A | * | 3/1943 | Zelnis | 137/197 |
| 2,337,449 | A | * | 12/1943 | Cattaneo et al. | 123/196 A |
| 2,374,822 | A | * | 5/1945 | Le Clair | 137/111 |
| 2,456,886 | A | * | 12/1948 | Mori | 184/6.23 |
| 2,570,134 | A | * | 10/1951 | Haeberlein et al. | 384/399 |
| 2,644,430 | A | * | 7/1953 | Lang | 184/1.5 |
| 2,781,778 | A | * | 2/1957 | Lisciani | 137/540 |
| 2,942,611 | A | * | 6/1960 | Klank, Jr. et al. | 137/43 |
| 3,016,977 | A | * | 1/1962 | Schweitzer et al. | 96/189 |
| 3,686,973 | A | * | 8/1972 | Davison et al. | 74/606 R |
| 3,722,624 | A | * | 3/1973 | Buckland | 184/6.11 |
| 3,777,848 | A | * | 12/1973 | Schaeffer et al. | 184/108 |
| 4,554,844 | A | * | 11/1985 | Hamano | 74/606 R |
| 4,561,867 | A | * | 12/1985 | Charbonnel | 96/191 |
| 4,595,118 | A | * | 6/1986 | Azuma et al. | 220/203.27 |
| 4,723,529 | A | * | 2/1988 | Yokoi et al. | 123/573 |
| 4,911,035 | A | * | 3/1990 | Taguchi | 74/606 R |
| 5,129,422 | A | * | 7/1992 | Davison et al. | 137/599.09 |
| 5,186,278 | A | * | 2/1993 | Ives et al. | 184/6.23 |
| 5,205,848 | A | * | 4/1993 | Blanc et al. | 55/310 |
| 5,215,164 | A | * | 6/1993 | Shibata | 184/6.13 |

(Continued)

FOREIGN PATENT DOCUMENTS

| | | |
|---|---|---|
| JP | A 56-113858 | 9/1981 |
| JP | B2 62-8670 | 2/1987 |

(Continued)

*Primary Examiner* — Henry Liu
(74) *Attorney, Agent, or Firm* — Oliff PLC (57) ABSTRACT

A breather device includes a main body that includes a breather chamber with an inner bottom surface; a first communicating portion provided at the main body; a second communicating portion provided at the main body and at a position above the first communicating portion in a vertical direction and away from the first communicating portion in a horizontal direction; and a downward gradient provided at the inner bottom surface of the breather chamber, the downward gradient guides the oil that has entered the breather chamber through the first communicating portion toward the first communicating portion.

18 Claims, 6 Drawing Sheets

(56) References Cited

U.S. PATENT DOCUMENTS

| | | | |
|---|---|---|---|
| 5,509,949 A * | 4/1996 | Gluys et al. | 55/385.3 |
| 5,579,744 A * | 12/1996 | Trefz | 123/573 |
| 5,650,677 A * | 7/1997 | Furukawa et al. | 310/88 |
| 5,724,864 A * | 3/1998 | Rodgers et al. | 74/606 R |
| 6,058,969 A * | 5/2000 | Bollwahn et al. | 137/583 |
| 6,065,369 A * | 5/2000 | Kosuge et al. | 74/606 R |
| 6,450,296 B1 * | 9/2002 | Seki et al. | 184/6.12 |
| 6,557,438 B2 * | 5/2003 | Maeda et al. | 74/606 R |
| 6,719,096 B2 * | 4/2004 | Mogi | 184/6.23 |
| 7,025,175 B1 * | 4/2006 | Pate | 184/6.23 |
| 7,114,412 B2 * | 10/2006 | Gotou et al. | 74/606 R |
| 7,191,870 B2 * | 3/2007 | Kimura et al. | 184/6.23 |
| 7,343,833 B2 * | 3/2008 | Matsushima | 74/607 |
| 7,370,729 B2 * | 5/2008 | Okuno et al. | 184/6.23 |
| 7,461,720 B2 * | 12/2008 | Min | 184/6.12 |
| 7,604,020 B2 * | 10/2009 | Kennedy | 137/197 |
| 2003/0000504 A1 * | 1/2003 | Katayama et al. | 123/516 |
| 2003/0010151 A1 * | 1/2003 | Johnson et al. | 74/606 R |
| 2003/0010311 A1 * | 1/2003 | Kurihara et al. | 123/196 R |
| 2003/0098204 A1 * | 5/2003 | Mogi | 184/6.23 |
| 2003/0188928 A1 * | 10/2003 | Okuno et al. | 184/6.23 |
| 2004/0231925 A1 * | 11/2004 | Matsushima | 184/6.23 |

FOREIGN PATENT DOCUMENTS

| | | |
|---|---|---|
| JP | U 2-94963 | 7/1990 |
| JP | A 11-82692 | 3/1999 |
| JP | A 2005-61456 | 3/2005 |
| WO | WO 03/004909 A1 | 1/2003 |

* cited by examiner

BREATHER DEVICE OF AUTOMATIC TRANSMISSION

INCORPORATION BY REFERENCE

The disclosure of Japanese Patent Application No. 2007-172895 filed on Jun. 29, 2007 including the specification, drawings and abstract is incorporated herein by reference in its entirety.

BACKGROUND

The present invention relates to a breather device of an automatic transmission.

In general, an automatic transmission that is mounted on a vehicle accommodates a power transmission mechanism portion formed by a torque converter, a speed change mechanism, and the like, in a case storing ATF (automatic transmission fluid) serving as hydraulic fluid and lubricating oil. Such a case is usually provided with a breather device that prevents the case from being damaged by an excessive load that is applied to the case when the pressure in the case increases due to an increase in oil pressure, for example.

The breather device has a breather chamber capable of communicating the case with the atmosphere. For example, when the pressure in the case exceeds the pressure outside the case, air in the case is discharged into the atmosphere through the breather chamber to eliminate the pressure difference between the inside and outside of the case. A breather device described in Japanese Utility Model Application Publication No. JP-A-H2-94963, for example, is known as such a breather device.

The breather device of Japanese Utility Model Application Publication No. JP-A-H2-94963 includes an oil chamber (i.e., a main body) that is attached to the upper side of a case. The oil chamber has an inlet passage that provides communication between the oil chamber and the case, an oil return passage that provides communication between the oil chamber and the case at a different location from the inlet passage, and a breather (i.e., an outlet passage) that provides communication between the inside and outside of the oil chamber at a different location from the inlet passage and the oil return passage.

High pressure air that has flowed into the oil chamber through the inlet passage is discharged to the outside of the oil chamber through the breather (the outlet passage), while ATF that has flowed into the oil chamber through the inlet passage with the high pressure air is returned into the case through the oil return passage.

SUMMARY

In the breather device of Japanese Utility Model Application Publication No. JP-A-H2-94963, the oil chamber is provided with not only the inlet passage and the breather (the outlet passage), but also the oil return passage for returning ATF that has flowed into and accumulated in the oil chamber. Since the oil return passage is additionally provided, the structure of the breather device becomes complicated. Moreover, since the oil chamber serving as a breather chamber has a horizontally flat inner bottom surface, it is difficult to return oil into the case.

The present invention provides a breather device of an automatic transmission that is capable of, with a simple structure, discharging high-pressure air that has flowed from a case into a breather chamber and into the atmosphere, and is capable of smoothly returning oil that has flowed into the breather chamber with the high-pressure air into the case. The present invention can also achieve various other advantages.

According to an exemplary aspect of the invention, a breather device of an automatic transmission that includes a case for accommodating a power transmission mechanism portion and oil, includes a main body that is attached to an upper part of the case, with the main body including a breather chamber that communicates air in the case with atmosphere outside the case and that includes an inner bottom surface; a first communicating portion provided at the main body and connected to an opening formed in the upper part of the case, the first communicating portion provides communication between the air in the case and the breather chamber; a second communicating portion provided at the main body and at a position above the first communicating portion in a vertical direction and away from the first communicating portion in a horizontal direction, the second communicating portion provides communication between the breather chamber and the atmosphere; and a downward gradient provided at the inner bottom surface of the breather chamber, the downward gradient guides the oil that has entered the breather chamber through the first communicating portion toward the first communicating portion.

According to an exemplary aspect of the invention, a breather device includes a first communicating portion provided at the main body; a second communicating portion provided at the main body and at a position above the first communicating portion in a vertical direction and away from the first communicating portion in a horizontal direction; and a downward gradient provided at the inner bottom surface of the breather chamber, the downward gradient guides the oil that has entered the breather chamber through the first communicating portion toward the first communicating portion.

According to an exemplary aspect of the invention, a breather device of an automatic transmission that includes a case for accommodating a power transmission mechanism portion and oil, includes a main body that is attached to an upper part of the case, with the main body including a breather chamber that communicates air in the case with atmosphere outside the case and that includes an inner bottom surface; a first communicating portion provided at the main body and connected to an opening formed in the upper part of the case, the first communicating portion provides communication between the air in the case and the breather chamber; a second communicating portion provided at the main body and at a position above the first communicating portion in a vertical direction and away from the first communicating portion in a horizontal direction, the second communicating portion provides communication between the breather chamber and the atmosphere; and a shielding portion that restrains the oil from flowing toward the second communicating portion when the oil enters the breather chamber through the first communicating portion, wherein the shielding portion is provided in the breather chamber.

BRIEF DESCRIPTION OF THE DRAWINGS

Various exemplary embodiments of the invention will be described with reference to the drawings, wherein.

DETAILED DESCRIPTION OF EMBODIMENTS

A breather device of an automatic transmission that is mounted on a front engine, rear drive (FR) type vehicle according to an embodiment of the present invention will now be described with reference to the accompanying drawings. In the following description, the "front-rear direction," "up-down direction," and "left-right direction" respectively correspond to the "front-rear direction," "up-down direction," and "left-right direction" based on FIG. 1 unless otherwise specified.

Figure 1:
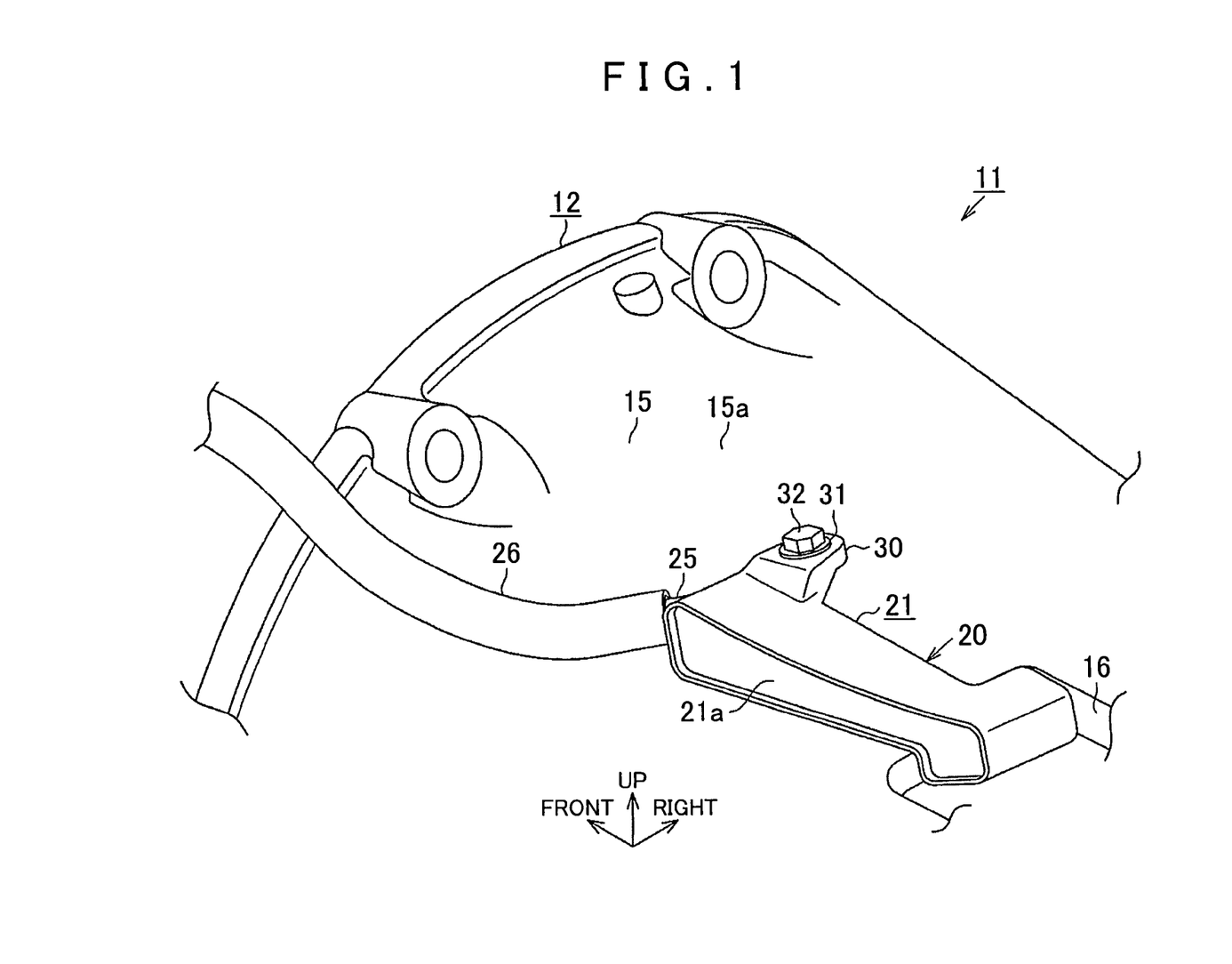
FIG. 1 is an enlarged perspective view of a main part of an automatic transmission.
Figure 2:
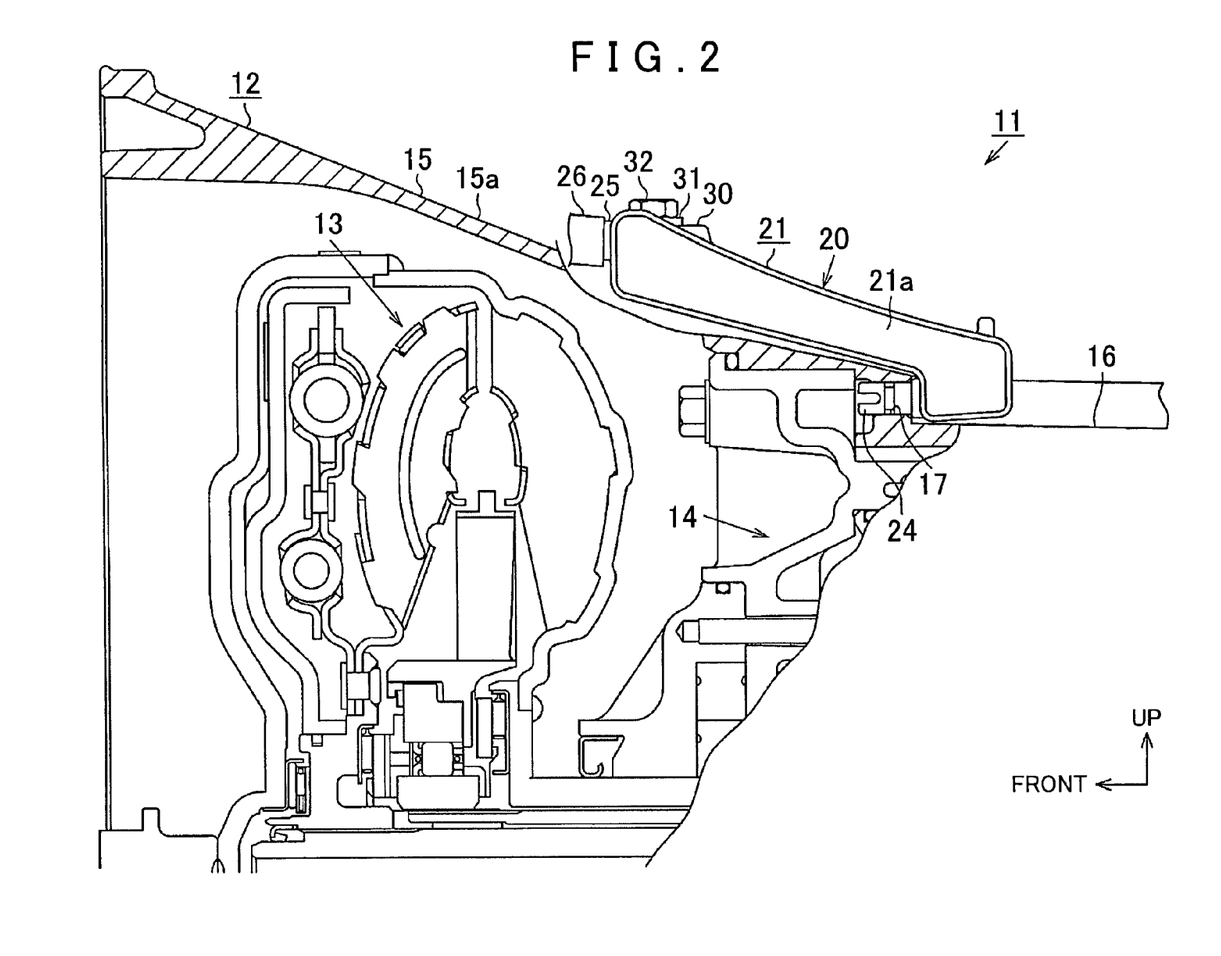
FIG. 2 is a cross-sectional view of the main part shown in FIG. 1.

As shown in FIGS. 1 and 2, provided that a vehicle traveling direction is forward, an automatic transmission 11 is provided along the front-rear direction. The automatic transmission 11 is formed by aluminum die cast molding and includes a case 12 that extends in the front-rear direction. A torque converter 13 that forms a power transmission mechanism portion is accommodated in a front part of the case 12, and a speed change mechanism 14 that forms the power transmission mechanism portion is accommodated in a central to a rear part of the case 12. ATF (automatic transmission fluid) as a fluid and oil is also stored in the case 12. The ATF functions as hydraulic fluid of the torque converter 13 and lubricating oil of the speed change mechanism 14. Air as a fluid is also present in the case 12.

The front part of the case 12, that is, the part corresponding to the torque converter 13 in the case 12, has an increased diameter portion 15 that is structured such that an outer diameter increases toward the front. A top surface 15a of the increased diameter portion 15 is therefore tilted upward toward the front. A recess 16 having a rectangular shape in a plan view is formed at a position slightly forward of a central part in the front-rear direction of a top surface of the case 12. A communicating hole 17 is formed in a front part of the recess 16 as an opening that connects the inside of the case 12 to the outside. A breather device 20 is provided on the top surface of the case 12 in a region from a front wall that forms the recess 16 to an approximately central part in the front-rear direction of the top surface 15a of the increased diameter portion 15. The breather device 20 thus extends in the front-rear direction along the top surface 15a of the increased diameter portion 15.

Hereinafter, a structure of the breather device 20 will be described with reference to FIGS. 3 through 9B.

Figure 3:
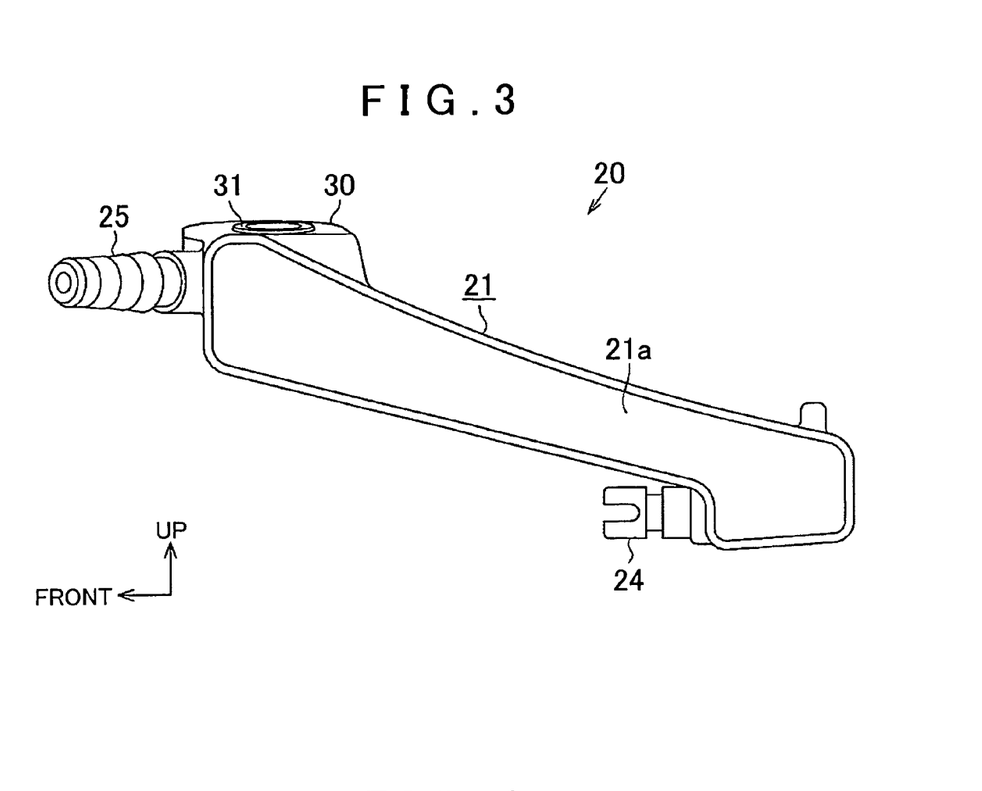
FIG. 3 is a left side view of a breather device.
Figure 4:
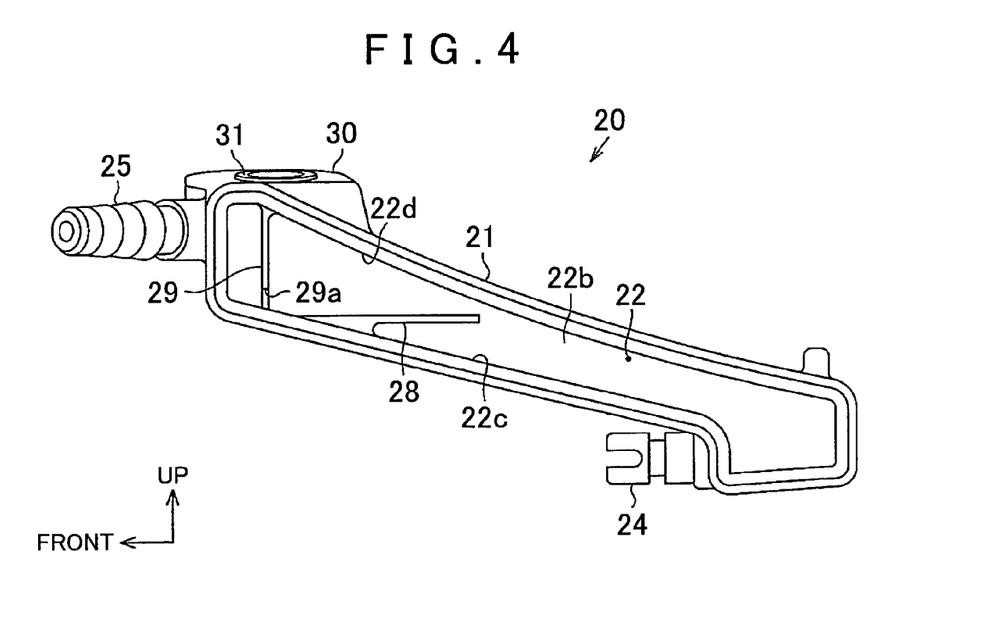
FIG. 4 is a left side view showing the inside of the breather device.

As shown in FIG. 3, the breather device 20 includes a main body 21 that is formed of a hollow synthetic resin and extends along the top surface of the case 12, that is, along the top surface 15a of the increased diameter portion 15. Accordingly, the main body 21 is tilted upward toward the front. FIG. 4 shows a state in which a left wall 21a of the main body 21 is removed. As shown in FIG. 4, a breather chamber 22 is formed inside the main body 21 along the whole length direction (front-rear direction) of the main body 21. Accordingly, like the main body 21, the breather chamber 22 extends along the top surface of the case 12, that is, along the top surface 15a of the increased diameter portion 15.

As shown in FIGS. 4 through 7, a rear end (or a lower end) of the main body 21 forms a bend portion 23. In a plan view, the bend portion 23 is bent at right angle to a portion of the main body 21 that extends in the front-rear direction. The bend portion 23 extends obliquely downward to the right when viewed from the back. A first connecting pipe 24 that extends straight forward is provided on a front surface of the bend portion 23 as a first communicating portion. The first connecting pipe 24 is structured to fit into the communicating hole 17 (see FIG. 2) of the case 12. When the first connecting pipe 24 fits into the communicating hole 17 (see FIG. 2), the case 12 (see FIG. 2) and the breather chamber 22 communicate with each other through the first connecting pipe 24, and the front surface of the bent portion 23 faces the front wall that forms the recess 16 (see FIG. 2).

A second connecting pipe 25 that extends straight obliquely forward to the left is provided as a second communicating portion in a central part in the left-right direction of an upper end of a front surface of the main body 21. The second connecting pipe 25 is connected to one end of a flexible breather hose 26 (see FIG. 1). Another end of the flexible breather hose 26 is open to the atmosphere (see FIG. 1 or 2). Accordingly, the breather chamber 22 and the atmosphere communicate with each other through the second connecting pipe 25 and the breather hose 26 (see FIG. 1 or 2).

An energy dissipation chamber 27 is provided inside the bend portion 23 so as to face the first connecting pipe 24. The energy dissipation chamber 27 forms a part of the breather chamber 22. An inner bottom surface 27b of the energy dissipation chamber 27 has a downward gradient toward the first connecting pipe 24. An opposing surface 27a of the energy dissipation chamber 27 to the first connecting pipe 24 is opposed to the second connecting pipe 25 through the first connecting pipe 24 in the front-rear direction (the horizontal direction). The distance from the first connecting pipe 24 to the opposing surface 27a in the front-rear direction (the horizontal direction) is shorter than that from the first connecting pipe 24 to the second connecting pipe 25 in the front-rear direction (the horizontal direction). In this embodiment, the distance from the first connecting pipe 24 to the second connecting pipe 25 in the front-rear direction (the horizontal direction) is set to about three times the distance from the first connecting pipe 24 to the opposing surface 27a in the front-rear direction (the horizontal direction).

Figure 5:
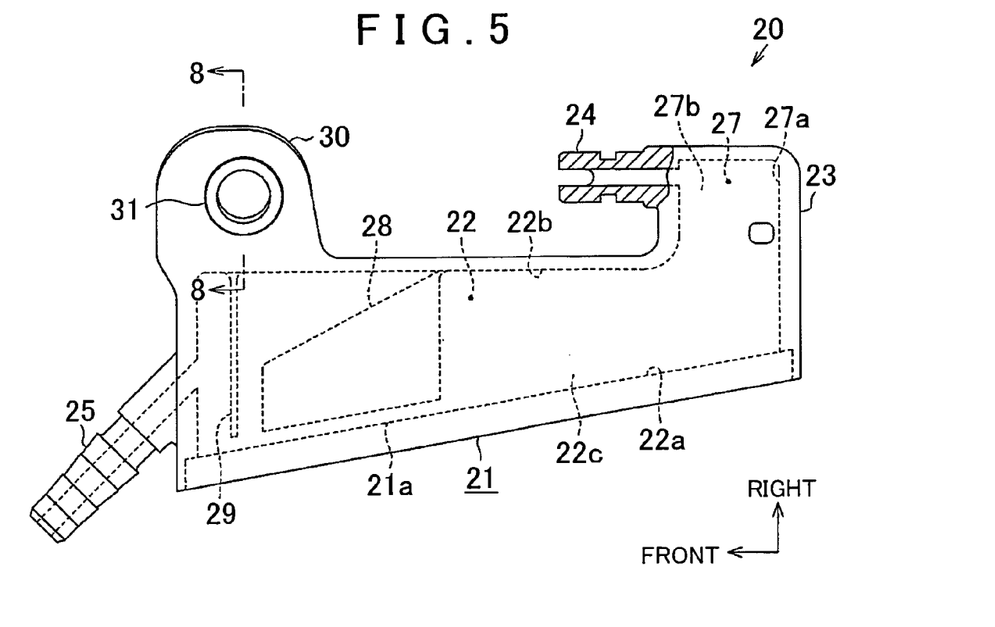
FIG. 5 is a plan view of the breather device.
Figure 6:
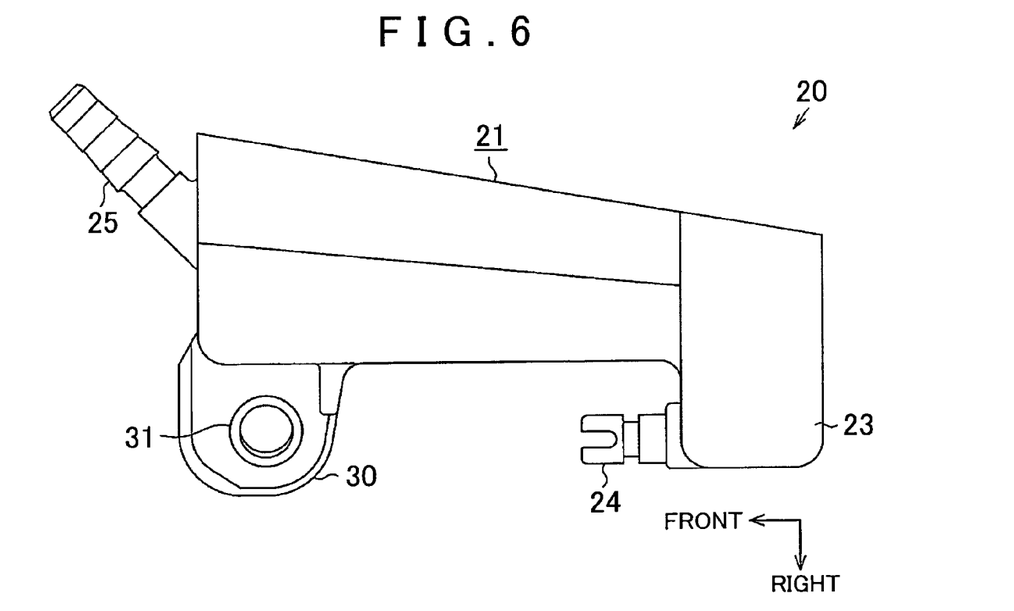
FIG. 6 is a bottom view of the breather device.
Figure 7:
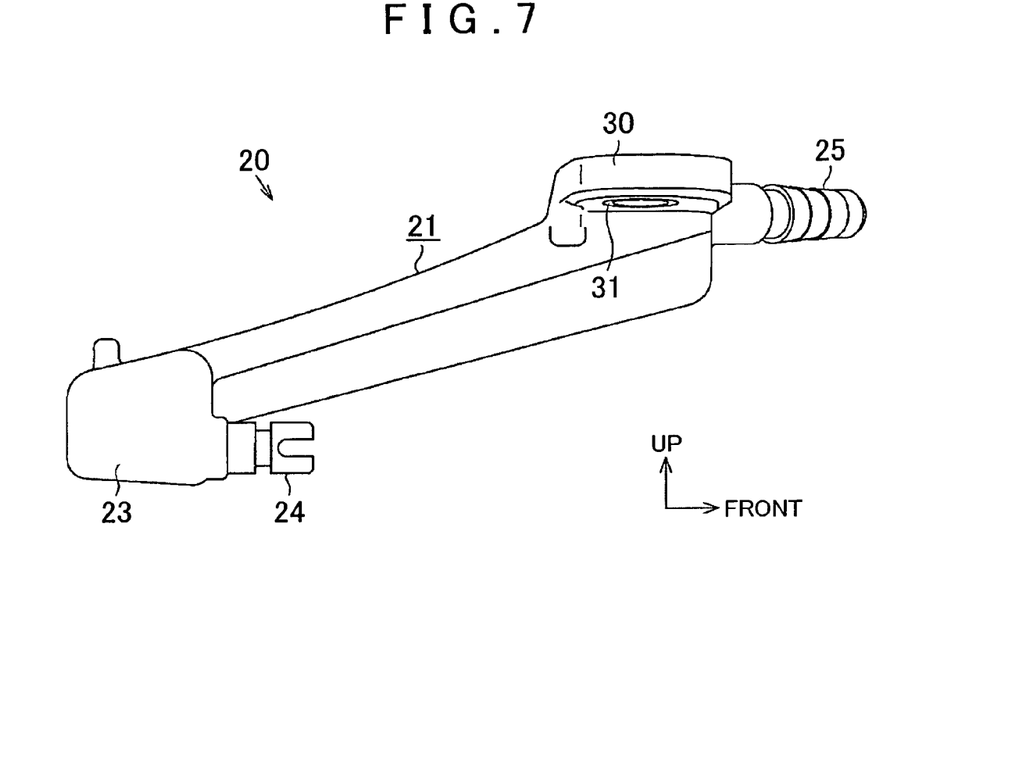
FIG. 7 is a right side view of the breather device.

As shown in FIGS. 4 and 5, a left inner side surface 22a of the breather chamber 22 excluding the energy dissipation chamber 27 is tilted so that a front end of the left inner side surface 22a is located leftward with respect to a rear end thereof. On the other hand, a right inner side surface 22b of the breather chamber 22 excluding the energy dissipation chamber 27 extends straight along the front-rear direction. Accordingly, the width in the left-right direction of the breather chamber 22 excluding the energy dissipation chamber 27 increases toward the front. An inner bottom surface 22c of the breather chamber 22 excluding the energy dissipation chamber 27 is tilted downward toward the back, that is, toward the energy dissipation chamber 27.

A lateral shielding plate 28 that forms a shielding portion and has a trapezoidal shape in a plan view is provided at a position close to a front end of the inner bottom surface 22c of the breather chamber 22 excluding the energy dissipation chamber 27. In other words, the lateral shielding plate 28 is fixed at its front end to the inner bottom surface 22c of the breather chamber 22 and extends horizontally rearward. Therefore, the distance between the lateral shielding plate 28 and the inner bottom surface 22c of the breather chamber 22 increases toward the back.

A front edge of the lateral shielding plate 28 has a length in the left-right direction about a half of a corresponding width in the left-right direction of the breather chamber 22, and is located at a leftward position. On the other hand, a right end of a rear edge of the lateral shielding plate 28 contacts the right inner side surface 22b of the breather chamber 22, and a left end of the rear edge of the lateral shielding plate 28 is located close to the left inner side surface 22a of the breather chamber 22. A left edge of the lateral shielding plate 28 extends in parallel with the left inner side surface 22a of the breather chamber 22, and a clearance is formed between the left edge of the lateral shielding plate 28 and the left inner side surface 22a of the breather chamber 22. A right edge of the lateral shielding plate 28 is tilted such that the distance between the right edge and the right inner side surface 22b of the breather chamber 22 is reduced toward the back.

A longitudinal shielding plate 29 that forms the shielding portion is provided at a position forward of the lateral shielding plate 28 and close to the second connecting pipe 25 in the breather chamber 22 so as to face the second connecting pipe 25. The longitudinal shielding plate 29 extends in a vertical direction perpendicularly to the lateral shielding plate 28. An upper edge, a right edge, and a lower edge of the longitudinal shielding plate 29 closely contact an inner top surface 22d, the right inner side surface 22b, and the inner bottom surface 22c of the breather chamber 22, respectively. A clearance is formed between a left edge of the longitudinal shielding plate 29 and the left inner side surface 22a of the breather chamber 22. At the lower edge of the longitudinal shielding plate 29, a notch 29a is formed from a central part in the left-right direction to a left end. The notch 29a is tilted such that the distance to the inner bottom surface 22c of the breather chamber 22 gradually increases toward the left. Accordingly, the area of an opposing surface of the longitudinal shielding plate 29 to the second connecting pipe 25 is set to be smaller than a corresponding vertical cross-sectional area of the breather chamber 22.

As shown in FIGS. 7, 8A, 9A, and 9B, a tongue-shaped portion 30 that extends rightward is formed at an upper end of a right surface in a front end of the main body 21 of the breather device 20. The tongue-shaped portion 30 is tilted with respect to a horizontal plane such that a tip of the tongue-shaped portion 30 is located slightly higher than a base end thereof. A through hole 30a having a circular shape in a plan view is formed in a central part of the tongue-shaped portion 30 so as to extend through the tongue-shaped portion 30 in the up-down direction. A cylindrical metal collar 31 as a cylindrical member is provided in the through hole 30a by insert molding so as to be integral with the tongue-shaped portion 30.

Figure 8A:
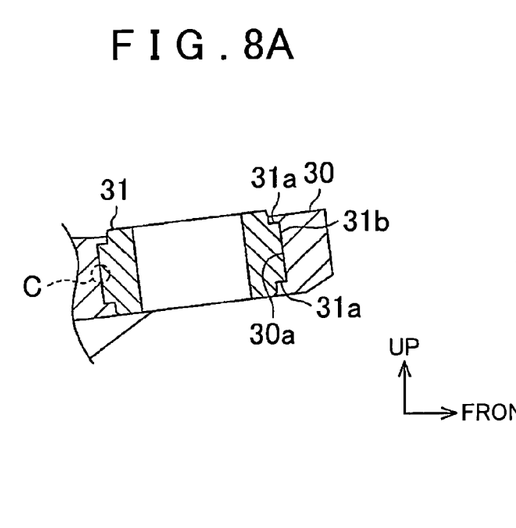
FIG. 8A is a cross-sectional view taken along line 8-8 in FIG. 5.
Figure 8B:
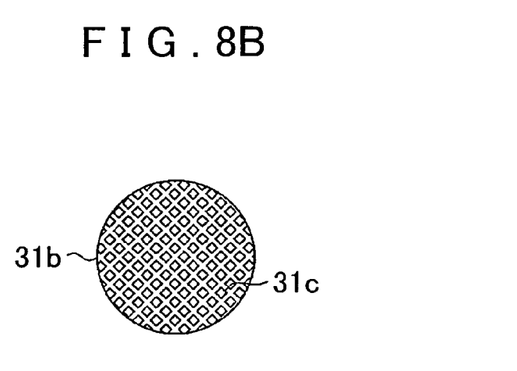
FIG. 8B is a partial enlarged view of an outer peripheral surface of a collar surrounded by circle C in FIG. 8A.
Figure 9A:
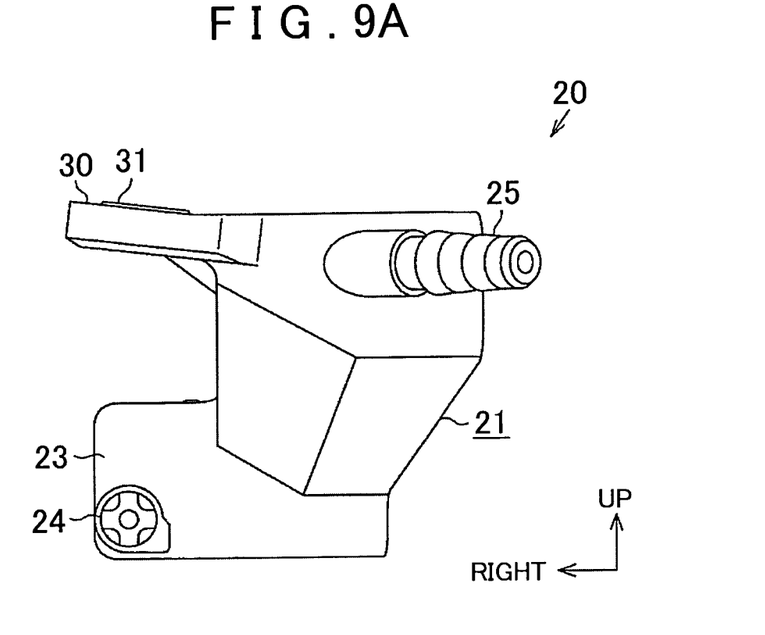
FIG. 9A is a front view of the breather device.
Figure 9B:
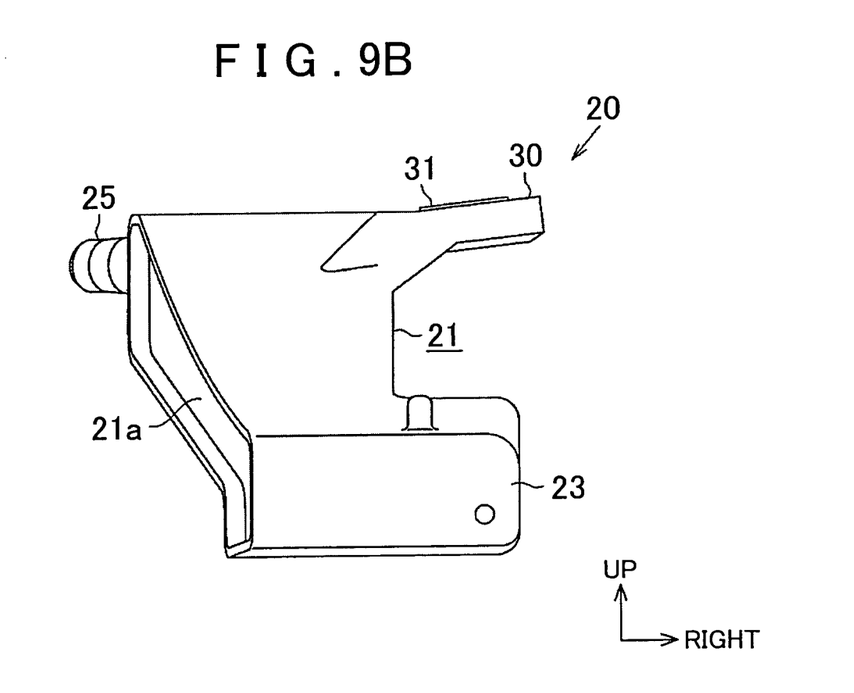
FIG. 9B is a rear view of the breather device.

As shown in FIG. 8A, a stepped notch portion 31a is provided in respective outer peripheral edges of a top surface and a bottom surface of the collar 31. Since the stepped notch portions 31a engage with the tongue-shaped portion 30, the collar 31 is prevented from getting out of the through hole 30a in the up-down direction. As shown in a partial enlarged view of FIG. 8B, protrusions 31c are formed on an outer peripheral surface 31b of the collar 31 as a corotation-suppressing portion. The protrusions 31c herein have a knurl pattern, such as a diamond-shaped pattern, which is formed by a knurling process.

As shown in FIGS. 1, 2, and 8A, with a metal bolt 32 inserted through the collar 31, the bolt 32 is screwed in the top surface of the case 12, whereby the breather device 20 is fixed to the top surface of the case 12. At this time, even if the rotating force produced by rotating the bolt 32 is transmitted to the collar 31, the collar 31 does not rotate with the bolt 32 because the protrusions 31c on the outer peripheral surface 31b of the collar 31 engage with an inner wall surface of the tongue-shaped portion 30 which forms the through hole 30a.

Hereinafter, functions of the breather device 20 will be described.

When the pressure in the case 12 becomes high, ATF, when present around the communicating hole 17, bursts into the energy dissipation chamber 27 through the first connecting pipe 24 together with the high-pressure air in the case 12. The ATF flowing into the energy dissipation chamber 27 impinges on the opposing surface 27a of the energy dissipation chamber 27. The ATF is thus caused to flow forward within the breather chamber 22 while changing the flow direction so as to flow from the left side along the shape of the breather chamber 22.

At this time, the ATF that has burst into the energy dissipation chamber 27 is a mixture of liquid ATF and bubbly ATF, and changing the flow direction reduces the flow force of the ATF. Moreover, the ATF accumulating in the energy dissipation chamber 27 flows toward the first connecting pipe 24 due to the gradient of the inner bottom surface 27b of the energy dissipation chamber 27 and returns into the case 12 through the first connecting pipe 24.

Of the ATF caused to flow forward within the breather chamber 22, mainly the liquid ATF flows forward on the inner bottom surface 22c of the breather chamber 22 and is therefore blocked by the lateral shielding plate 28. This ATF is thus prevented from flowing toward the second connecting pipe 25 and is returned toward the first connecting pipe 24. On the other hand, mainly the bubbly ATF of the ATF caused to flow forward within the breather chamber 22 passes the lateral shielding plate 28 and flows toward the second connecting pipe 25 together with the air.

Mainly, the bubbly ATF that has passed the lateral shielding plate 28 is then blocked by the longitudinal shielding plate 29. This ATF is thus prevented from flowing directly into the second connecting pipe 25 and is returned toward the first connecting pipe 24. In the case, where mainly the bubbly ATF flows into the space in front of the longitudinal shielding plate 29 through the clearance on the left side of the longitudinal shielding plate 29, this ATF is returned toward the first connecting pipe 24 through the clearance between the notch 29a of the longitudinal shielding plate 29 and the inner bottom surface 22c of the breather chamber 22. Since the air in the breather chamber 22 is discharged into the atmosphere through the second connecting pipe 25 and the breather hose 26, the pressure increase in the case 12 is quickly suppressed, whereby the pressure difference between the inside and outside of the case 12 is reduced.

As described above, the breather device 20 returns ATF that has flowed into the breather chamber 22 from the first connecting pipe 24 with high pressure air in the case 12 back into the case 12 through the first connecting pipe 24 without allowing the ATF to enter the second connecting pipe 25. The breather device 20 discharges only the air into the atmosphere through the second connecting pipe 25 and the breather hose 26. In other words, the breather device 20 eliminates the pressure difference between the inside and outside of the case 12 without scattering ATF to the outside through the second connecting pipe 25.

In the case where the breather device of an automatic transmission of the related art is mounted on an FR type vehicle, the oil return passage for returning ATF in the oil chamber (a breather chamber) into the case is located in a vehicle front part of the case. Therefore, during acceleration of the vehicle, the ATF in the oil chamber may accumulate in the inlet passage and may be less likely to return into the case.

In this embodiment, on the other hand, the breather device 20 is mounted on a vehicle front part of the case 12 of the automatic transmission 11 mounted on a FR type vehicle. Therefore, ATF that has entered the breather chamber 22 during deceleration of the vehicle can be smoothly returned into the case 12 during acceleration of the vehicle. The reason for this is as follows: in general, in the case where a breather hole (an inlet passage) of the case 12 of the automatic transmission 11 is provided on the upper side of the case as much as possible and in the vehicle front part at a position close to the torque converter in a FR type vehicle, ATF is more likely to flow into the breather chamber 22 during deceleration of the vehicle and is less likely to flow into the breather chamber 22 during acceleration of the vehicle.

In the breather device of an automatic transmission of the related art, there is no obstacle between the inlet passage and the breather chamber in the oil chamber. Therefore, in the case where ATF in the oil chamber is bubbly, the bubbly ATF may leak from the breather chamber to the outside.

In this embodiment, however, such a problem can be eliminated by the longitudinal shielding plate 29 provided in the breather chamber 22.

The following effects can be obtained by the embodiment described above in detail:

(1) In the breather device 20, the inner bottom surface 22c of the breather chamber 22 has a downward gradient for guiding ATF that has entered the breather chamber 22 through the first connecting pipe 24 toward the first connecting pipe 24. Therefore, the first connecting pipe 24 functions as a return passage for returning ATF from the breather chamber 22 into the case 12. Since a separate return passage for returning ATF from the breather chamber 22 into the case 12 need not be provided, the structure of the breather device 20 can be simplified.

Moreover, high pressure air that has entered the breather chamber 22 can be discharged into the atmosphere from the second connecting pipe 25 through the breather hose 26, and ATF that has entered the breather chamber 22 with the high pressure air can be guided toward the first connecting pipe 24 by the downward gradient of the inner bottom surface 22c of the breather chamber 22. Therefore, with a simple structure, high-pressure air that has entered the breather chamber 22 from the case 12 can be discharged into the atmosphere and ATF that has entered the breather chamber 22 with the high-pressure air can be smoothly returned into the case 12.

(2) The energy dissipation chamber 27 is provided in the breather chamber 22 so as to face the first connecting pipe 24. Therefore, the flow force of ATF that has entered the breather chamber 22 from the first connecting pipe 24 with high-pressure air can be reduced in the energy dissipation chamber 27 by changing the flow direction of the ATF. The ATF that has entered the breather chamber 22 from the first connecting pipe 24 with the high-pressure air can thus be restrained from flowing toward the second connecting pipe 25.

(3) The lateral shielding plate 28 is provided on the inner bottom surface 22c of the breather chamber 22. Therefore, mainly the liquid ATF that is flowing on the inner bottom surface 22c toward the second connecting pipe 25 can be blocked by the lateral shielding plate 28, while allowing air to flow above the lateral shielding plate 28 toward the second connecting pipe 25.

(4) The longitudinal shielding plate 29 is provided near the second connecting pipe 25 in the breather chamber 22 so as to face the second connecting pipe 25. Therefore, the longitudinal shielding plate 29 can block mainly the bubbly ATF that has passed the lateral shielding plate 28 and is flowing directly toward the second connecting pipe 25. Moreover, a clearance is formed on the left side of the longitudinal shielding plate 29 and under the longitudinal shielding plate 29 (at the position corresponding to the notch 29a) in the breather chamber 22. Therefore, the air can be made to flow toward the second connecting pipe 25 through these clearances. Since the longitudinal shielding plate has the notch 29a at a bottom position that is farthest from the second communicating portion, the longitudinal shielding plate can sufficiently block oil that flows toward the second communicating portion after entering the breather chamber. Moreover, even if mainly the bubbly ATF flows beyond the longitudinal shielding plate 29 toward the second connecting pipe 25, this ATF can be returned toward the first connecting pipe 24 through the clearances provided on the left side of the longitudinal shielding plate 29 and under the longitudinal shielding plate 29.

(5) The inner bottom surface 27b of the energy dissipation chamber 27 is tilted downward toward the first connecting pipe 24. With this tilt, ATF that accumulates in the energy dissipation chamber 27 can be guided to the first connecting pipe 24 and can be smoothly returned into the case 12 from the first connecting pipe 24.

(6) The distance from the first connecting pipe 24 to the opposing surface 27a of the energy dissipation chamber 27 in the front-rear direction is shorter than that from the first connecting pipe 24 to the second connecting pipe 25 in the front-rear direction. Therefore, ATF that accumulates in the energy dissipation chamber 27 can be more easily returned into the case 12 from the first connecting pipe 24.

(7) The breather device 20 is shaped such that the main body 21 extends along the top surface of the case 12. Therefore, the main body 21 is not bulky on the top surface of the case 12. As a result, the mounting capability of the automatic transmission 11 on a vehicle can be improved.

(8) During acceleration of a vehicle in which the internal pressure of the case 12 is likely to increase, ATF tends to accumulate in a rear part of the case 12 due to an inertial force caused by the acceleration. In this embodiment, however, the second connecting pipe 25 of the breather device 20 is provided forward of the communicating hole 17 that is located forward of the central part in the front-rear direction of the case 12. Therefore, ATF can be effectively restrained from scattering from the second connecting pipe 25 into the atmosphere through the breather hose 26.

(9) Normally, in the case where the automatic transmission 11 is mounted on a front engine, rear drive (FR) type vehicle, there is no excessive space between the vehicle and the top surface of the case 12. In this embodiment, however, most of the main body 21 of the breather device 20 is located on the top surface of the case 12, which corresponds to the torque converter 13 (the top surface 15a of the increased diameter portion 15), and the breather chamber 22 is shaped to extend along the top surface of the case 12. Therefore, the mounting capability of the automatic transmission 11 on a vehicle can be improved.

(10) In the breather device 20, the collar 31 is provided in the through hole 30a of the tongue-shaped portion 30 by insert molding so as to be integral with the tongue-shaped portion 30, and the protrusions 31c having a knurl pattern are formed on the outer peripheral surface 31b of the collar 31. Therefore, with the bolt 32 inserted through the collar 31, the bolt 32 is screwed in the top surface of the case 12, whereby the breather device 20 is fixed to the case 12. At this time, even if the rotating force of the bolt 32 is transmitted to the collar 31, the collar 31 is prevented from rotating with the bolt 32 because the protrusions 31c on the outer peripheral surface 31b of the collar 31 engage with the inner surface of the through hole 30a. Moreover, by forming the knurl pattern on the outer peripheral surface 31b of the collar 31, the protrusions 31c can be easily formed on the outer peripheral surface 31b.

Note that the above embodiment may be modified as follows:

The protrusions 31c may have a straight knurl pattern that is formed by knurling the outer peripheral surface 31b of the collar 31.

Instead of knurling the outer peripheral surface 31b of the collar 31, at least one protrusion may be formed on the outer peripheral surface 31b of the collar 31 as a corotation-suppressing portion.

Instead of the collar 31, a nut that can be screwed onto the bolt 32 may be provided as a cylindrical member.

The breather chamber 22 and the main body 21 need not necessarily be shaped to extend along the top surface of the case 12.

The breather device 20 may be provided in the central or rear part in the front-rear direction on the top surface of the case 12.

The distance from the first connecting pipe 24 to the opposing surface 27a of the energy dissipation chamber 27 in the front-rear direction need not necessarily be shorter than the distance from the first connecting pipe 24 to the second connecting pipe 25 in the front-rear direction.

The inner bottom surface 27b of the energy dissipation chamber 27 need not necessarily have a downward gradient toward the first connecting pipe 24. For example, the inner bottom surface 27b of the energy dissipation chamber 27 may extend horizontally.

At least one of the lateral shielding plate 28 and the longitudinal shielding plate 29 may be omitted.

The lateral shielding plate 28 may be tilted with respect to a horizontal plane.

The longitudinal shielding plate 29 may be tilted with respect to a vertical plane.

The notch 29a of the longitudinal shielding plate 29 may be omitted.

A plurality of lateral shielding plates 28 and a plurality of longitudinal shielding plates 29 may be provided in the breather chamber 22.

The energy dissipation chamber 27 in the breather chamber 22 may be omitted.

What is claimed is:

1. A breather device of an automatic transmission that includes a case for accommodating a power transmission mechanism portion and oil, the breather device comprising:
    a main body that is separate from the case and is attached via an external upper part of the case, with the main body including a breather chamber that communicates air in the case with atmosphere outside the case and that includes an inner bottom surface;
    a first communicating portion provided at the main body and connected to an opening formed in the upper part of the case, the first communicating portion provides communication on an upper surface of the case between the air in the case and the breather chamber, and the first communicating portion and the opening are arranged such that the air in the case passes through the opening and then through the first communicating portion before reaching the breather chamber;
    a second communicating portion provided at the main body and at a position above the first communicating portion in a vertical direction and away from the first communicating portion in a horizontal direction, the second communicating portion provides communication between the breather chamber and the atmosphere;
    a downward gradient provided at the inner bottom surface of the breather chamber, the downward gradient guides the oil that has entered the breather chamber through the opening and the first communicating portion into the first communicating portion; and
    an energy dissipation chamber that reduces a flow force of fluid that has entered the breather chamber through the opening and the first communicating portion by changing a flow direction of the fluid, the energy dissipation chamber is provided in the breather chamber so as to face the first communicating portion,
    wherein an opposing surface of the energy dissipation chamber to the first communicating portion is opposed to the second communicating portion in the horizontal direction through the first communicating portion.

2. The breather device of the automatic transmission according to claim 1, wherein the energy dissipation chamber has the inner bottom surface.

3. The breather device of the automatic transmission according to claim 1, wherein a horizontal distance from the first communicating portion to the opposing surface is shorter than a horizontal distance from the first communicating portion to the second communicating portion.

4. The breather device of the automatic transmission according to claim 1, wherein the downward gradient is provided at the energy dissipation chamber and between the energy dissipation chamber and the second communicating portion.

5. The breather device of the automatic transmission according to claim 1, further comprising:
    a bend portion that is bent at a right angle to the horizontal direction with the first communicating portion provided on a surface of the bend portion.

6. The breather device of the automatic transmission according to claim 1, further comprising:
    a shielding portion that restrains the oil from flowing toward the second communicating portion when the oil enters the breather chamber through the first communicating portion, wherein the shielding portion is provided in the breather chamber.

7. The breather device of the automatic transmission according to claim 6, wherein the shielding portion includes a lateral shielding plate that extends from the second communicating portion toward the first communicating portion on the inner bottom surface of the breather chamber having the downward gradient, the lateral shielding plate extends such that a distance between the lateral shielding plate and the inner bottom surface increases toward the first communicating portion.

8. The breather device of the automatic transmission according to claim 6, wherein:
    the shielding portion includes a longitudinal shielding plate provided in the breather chamber at a position closer to the second communicating portion than the first communicating portion so as to face the second communicating portion, and
    an area of an opposing surface of the longitudinal shielding plate to the second communicating portion is smaller than a vertical cross-sectional area of the breather chamber.

9. The breather device of the automatic transmission according to claim 8, wherein the opposing surface of the longitudinal shielding plate to the second communicating portion has a notch in a lower portion in a vertical direction.

10. The breather device of the automatic transmission according to claim 1, further comprising:

a lateral shielding plate that extends from the second communicating portion toward the first communicating portion on the inner bottom surface of the breather chamber having the downward gradient, the lateral shielding plate extends such that a distance between the lateral shielding plate and the inner bottom surface increases toward the first communicating portion; and a longitudinal shielding plate provided in the breather chamber at a position between the second communicating portion and the lateral shielding plate so as to face the second communicating portion, wherein an area of an opposing surface of the longitudinal shielding plate to the second communicating portion is smaller than a vertical cross-sectional area of the breather chamber.

11. The breather device of the automatic transmission according to claim 1, wherein the main body is shaped so as to extend along the upper surface of the case.

12. The breather device of the automatic transmission according to claim 1, wherein the main body is shaped so as to extend along the upper surface of the case that is tilted upward.

13. The breather device of the automatic transmission according to claim 1, wherein:

the case is mounted on a vehicle along a traveling direction of the vehicle, and provided that the traveling direction of the vehicle is forward, the opening is located forward of a central part in a front-rear direction of the case, and the second communicating portion is located forward of the opening.

14. The breather device of the automatic transmission according to claim 1, wherein:

the power transmission mechanism portion includes a torque converter, at least a part of the main body is located on the upper surface of the case corresponding to the torque converter, and the breather chamber is shaped so as to extend along the upper surface of the case.

15. A breather device comprising:

a main body that includes a breather chamber with an inner bottom surface;

a first communicating portion provided at the main body;

a second communicating portion provided at the main body and at a position above the first communicating portion in a vertical direction and away from the first communicating portion in a horizontal direction;

a downward gradient provided at the inner bottom surface of the breather chamber, the downward gradient guides the oil that has entered the breather chamber through the first communicating portion into the first communicating portion; and an energy dissipation chamber that reduces a flow force of fluid that has entered the breather chamber through the first communicating portion by changing a flow direction of the fluid, the energy dissipation chamber is provided in the breather chamber so as to face the first communicating portion, wherein an opposing surface of the energy dissipation chamber to the first communicating portion is opposed to the second communicating portion in a horizontal direction through the first communicating portion, and wherein the breather device is separate from a case for accommodating a power transmission mechanism portion and the breather device is capable of being attached to the case.

16. The breather device according to claim 15, further comprising:

a shielding portion that restrains the oil from flowing toward the second communicating portion when the oil enters the breather chamber through the first communicating portion, wherein the shielding portion is provided in the breather chamber.

17. The breather device according to claim 15, further comprising:

a bend portion that is bent at a right angle to the horizontal direction with the first communicating portion provided on a surface of the bend portion.

18. A breather device of an automatic transmission that includes a case for accommodating a power transmission mechanism portion and oil, the breather device comprising:

a main body that is separate from the case and is attached via an external upper part of the case, with the main body including a breather chamber that communicates air in the case with atmosphere outside the case and that includes an inner bottom surface;

a first communicating portion provided at the main body and connected to an opening formed in the upper part of the case, the first communicating portion provides communication on an upper surface of the case between the air in the case and the breather chamber, and the first communication portion and the opening are arranged such that the air in the case passes through the opening and then through the first communicating portion before reaching the breather chamber;

a second communicating portion provided at the main body and at a position above the first communicating portion in a vertical direction and away from the first communicating portion in a horizontal direction, the second communicating portion provides communication between the breather chamber and the atmosphere;

a shielding portion that restrains the oil from flowing toward the second communicating portion and directs the oil into the first communicating portion when the oil enters the breather chamber through the opening and the first communicating portion, wherein the shielding portion is provided in the breather chamber; and an energy dissipation chamber that reduces a flow force of fluid that has entered the breather chamber through the opening and the first communicating portion by changing a flow direction of the fluid, the energy dissipation chamber is provided in the breather chamber so as to face the first communicating portion, wherein an opposing surface of the energy dissipation chamber to the first communicating portion is opposed to the second communicating portion in a horizontal direction through the first communicating portion.

* * * * *